United States Patent [19]
Thomas et al.

[11] Patent Number: 5,357,736
[45] Date of Patent: Oct. 25, 1994

[54] LAWN MOWER WITH MEANS FOR SELECTIVELY COLLECTING GRASS AND GRASS PLUS GARDEN DEBRIS, AND METHOD OF USING

[75] Inventors: W. Roger Thomas, Cleveland; Craig D. Webster, Jesmond, both of England

[73] Assignee: Black & Decker Inc., Newark, Del.

[21] Appl. No.: 904,790

[22] Filed: Jun. 26, 1992

[30] Foreign Application Priority Data

Jun. 29, 1991 [GB] United Kingdom ................. 9114130

[51] Int. Cl.⁵ ............................................. A01D 34/70
[52] U.S. Cl. ..................................... 56/12.8; 56/13.4; 56/DIG. 8
[58] Field of Search ................. 56/12.8, 13.4, 202, 56/205, DIG. 3, DIG. 8, DIG. 2

[56] References Cited

U.S. PATENT DOCUMENTS

| | | |
|---|---|---|
| 3,373,514 | 3/1968 | Forren . |
| 3,871,052 | 3/1975 | Luckcuck ................. 56/13.1 X |
| 3,905,181 | 9/1975 | Messner ................... 56/13.1 |
| 4,361,001 | 11/1982 | Almond et al. ........... 56/13.4 X |
| 4,488,395 | 12/1984 | Mack ....................... 56/13.4 |
| 5,048,275 | 9/1991 | Fassauer ................... 56/12.8 |
| 5,113,642 | 5/1992 | Dunn ....................... 56/12.8 |
| 5,123,235 | 6/1992 | Fassauer ................... 56/13.4 X |

FOREIGN PATENT DOCUMENTS

| | | |
|---|---|---|
| 2027796 | 10/1990 | Canada . |
| 0464809 | 7/1991 | European Pat. Off. . |
| 8503620 | 8/1985 | PCT Int'l Appl. . |
| 2127665 | 10/1982 | United Kingdom . |

Primary Examiner—David J. Bagnell
Attorney, Agent, or Firm—Charles E. Yocum; Dennis A. Dearing; John D. Del Ponti

[57] ABSTRACT

A lawn mower of the type which collects grass cuttings includes a motor-driven blade rotatable about a sustantially vertical axis, at least one fan rotatable about the same axis, and a grass collecting system of the type in which grass collection is aided by suction from an airstream produced by the fan. It includes a closure which is selectively adjustable to at least two positions: one in which a grass collection aperture in a grass box is closed and a debris collection aperture in the grass box is open, and the other in which the grass collection aperture is open and the debris collection aperture is closed. A second embodiment includes a closure which is selectively adjustable to at least two positions: one in which both the grass collection aperture and the debris collection aperture are open, and the other in which only the grass collection aperture is open.

9 Claims, 4 Drawing Sheets

LAWN MOWER WITH MEANS FOR SELECTIVELY COLLECTING GRASS AND GRASS PLUS GARDEN DEBRIS, AND METHOD OF USING

BACKGROUND OF THE INVENTION

This invention relates to a lawn mower, and is particularly concerned with a lawn mower of the type which comprises a motor-driven blade and one or more fans rotatable about a substantially vertical axis. Lawn mowers of this type include both mowers which are supported on wheels, known as "wheeled rotary mowers", and those which in operation are supported on a cushion of air, known as "hover" mowers.

The first rotary and hover mowers left the cut grass, normally in a finely divided state, on the ground. Users could then either leave the cut grass on the ground, for example as a mulch, or they could pick up the cut grass in a secondary operation. In due course attempts were made to design mowers of the rotary or hover type which picked up the grass as they went along.

A number of designs of lawn mowers have been proposed in which the cut grass is sucked up by an air stream which is either specifically created for that purpose, or, in the case of a hover mower, then forms or contributes to the formation of the air cushion on which the mower hovers.

Garden tools have also been provided which collect leaves and other debris from the lawn, and include motorized rakes and garden vacuum cleaners of various types. It is a disadvantage of these tools that they are used for only a short time during the year, in particular in Autumn when leaves are falling, and a potential purchaser may feel that this occassional use does not justify either the expense of purchasing or the need for storing a machine dedicated to this single task.

Mowers which are provided with a suction system for collecting cut grass are designed so that the aperture through which the cut grass is picked up is located in the area of the mower deck where the cut grass is principally deposited during the mowing operation. Such mowers are not suitable for the collection of leaves and other debris from lawns, which are more generally distributed about the lawn.

It has been proposed, in GB Patent Application No. 2,127,665, to attach to the mower a flexible hose which is a remote suction pick-up for grass and debris. Such a machine would be very inconvenient to handle, inasmuch as a separate control would be required for directing the nozzle mounted on the end of the flexible hose toward the debris to be collected.

SUMMARY OF THE INVENTION

It is therefore an object of the present invention to provide a lawn mower having a collection system which can be used both for the collection of grass cuttings and for the collection of leaves and other garden debris.

The present invention provides a lawn mower of the type which collects grass cuttings, which mower includes a motor-driven blade rotatable about a substantially vertical axis, at least one fan rotatable about the same axis, the blade and fan being surrounded by a hood having one or more inlets for air, and grass collecting means in which grass collection is aided by suction from an airstream produced by the at least one fan. The grass collecting means is adjustable between a first position in which it is adapted to collect grass cut by the mower and deposited on the ground, and a second position in which it is adapted to collect garden debris lying on the ground.

The grass collecting means preferably includes a grass box provided with a first aperture for grass collection and a second aperture for debris collection, and a closure which is adapted to be adjusted between a first position in which the grass collection aperture is closed and the debris collection aperture is open, and a second position in which the grass collection aperture is open and the debris collection aperture is closed.

In an alternative embodiment, the grass collecting means includes a grass box provided with a first aperture for grass collection and a second aperture for debris collection, and a closure which is adapted to be adjusted between a first position in which both the grass collection aperture and the debris collection aperture are open, and a second position in which the grass collection aperture is open and the debris collection aperture is closed.

The closure of the grass collecting means may be mounted internally or externally of the grass box.

BRIEF DESCRIPTION OF THE DRAWINGS

The invention will now be further described with reference to the accompanying drawings, of which

DESCRIPTION OF THE PREFERRED EMBODIMENTS

Figure 1:
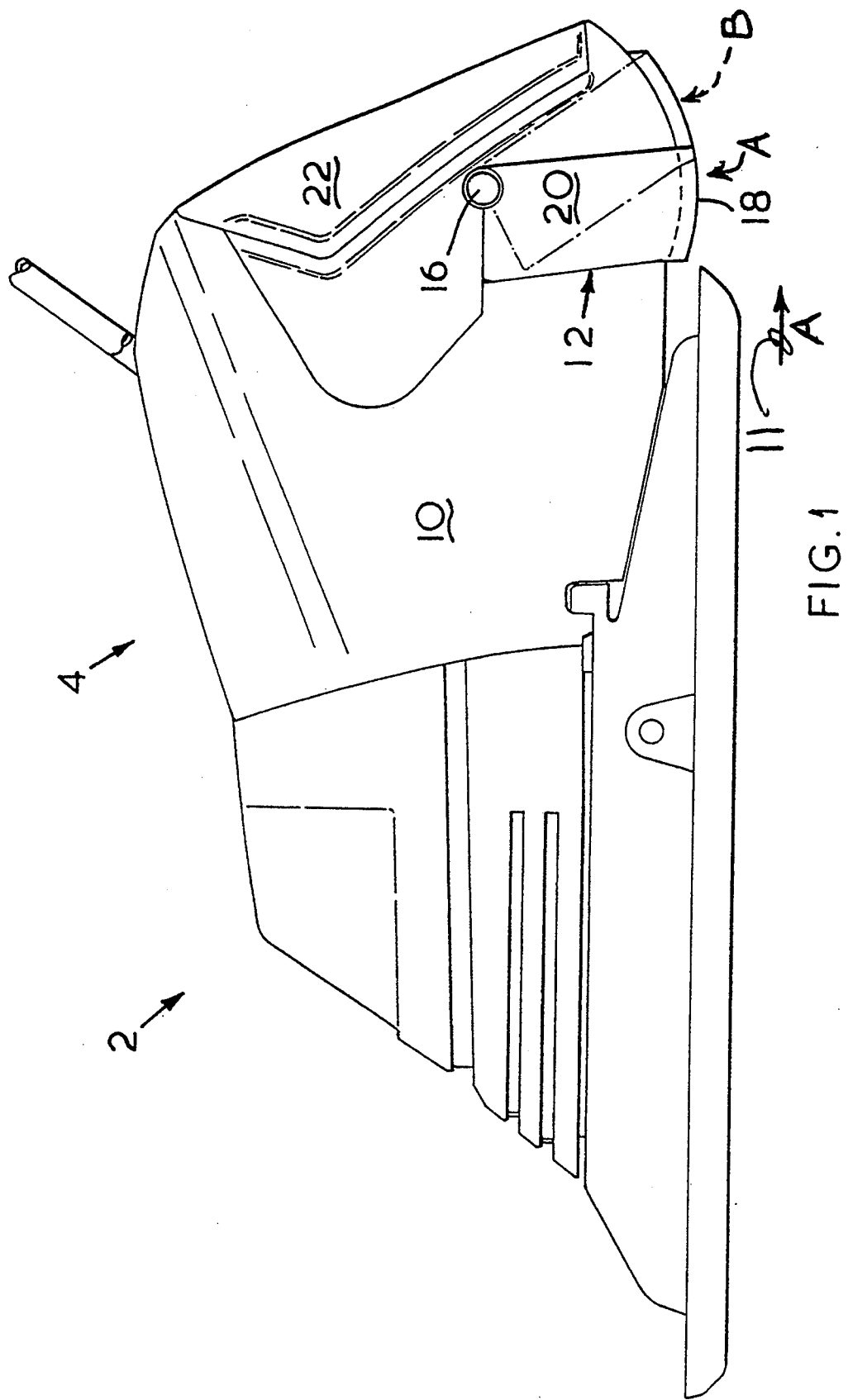
FIG. 1 is a general view of a first embodiment of a lawn mower according to the present invention showing the grass collecting means.
Figure 2:
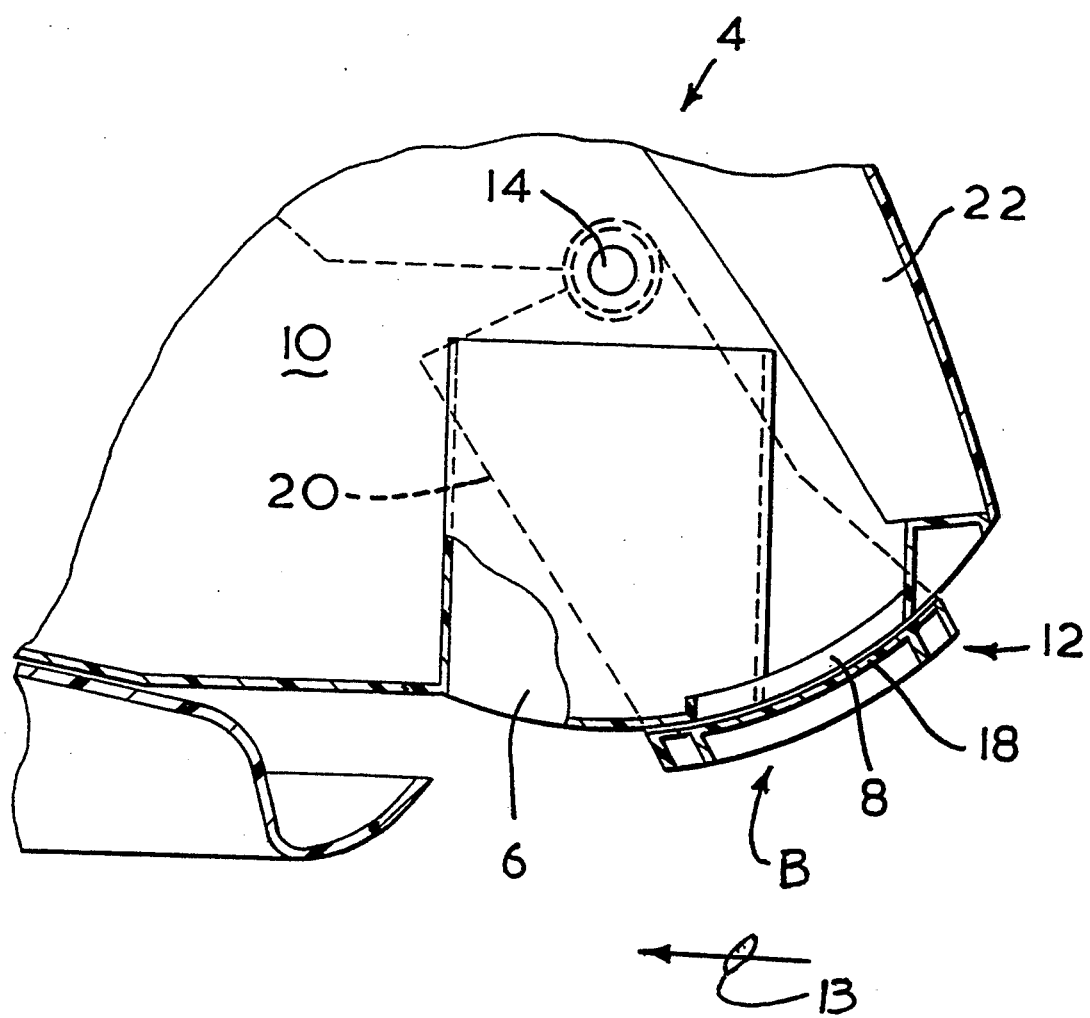
FIG. 2 is an enlarged detail view, partially in section, of the embodiment of FIG. 1 showing the grass collecting means arranged to collect grass cuttings.

In a first embodiment of a lawn mower according to the present invention, as shown in FIGS. 1 and 2, a hover mower 2 includes a grass box 4 which is provided with a grass collection aperture 6. The aperture 6 is positioned in the base of the grass box in the area where the cut grass is deposited during mowing. The grass box 4 is further provided with a debris collection aperture 8 at the base of the substantially vertical wall 10 of the grass box 4. A closure or flap 12 is pivotally mounted at pivot points 14, 16 on the side walls of the grass box 4. The flap 12 includes a substantially rectangular portion 18 which corresponds in size and shape to the debris collection aperture 8, and two attachment arms 20 at right angles to the rectangular portion 18. The pivot points 14, 16 are located on the attachment arms 20. A suitable locking mechanism (not shown) may be provided so that the flap 12 can be locked in a first position A, a second position B, or in any discrete position in between to allow partial opening of the debris collection aperture 8.

The grass box 4 is provided with a removable lid 22 so that it can be emptied.

In operation, the mower can be used in a debris collection mode, as shown in solid lines in FIG. 1, or a grass collecting mode as shown in dotted lines in FIG. 1 and in FIG. 2. For debris collection, the flap 12 is located in a first position A, in which the grass collection aperture 6 is closed by the flap 12 and the debris collection aperture 8 is open. The mower is pushed in the opposite direction to that used for grass cutting and collection, i.e. with the debris collection aperture to the front, as indicated by arrow 11 in FIG. 1. As the mower is operated, the full width of the aperture is available to suck up garden debris and collect it in the grass box.

For grass collection, the flap 12 is moved to the second position B, in which the debris collection aperture 8 is blocked and the grass collection aperture 6 is open. The mower is now operated in the "forward" direction, as indicated by arrow 13 in FIG. 2. The suction is directed to the grass collection aperture 6 so that the cut grass is collected from the areas where it has been deposited by the mower 2.

Figure 3:
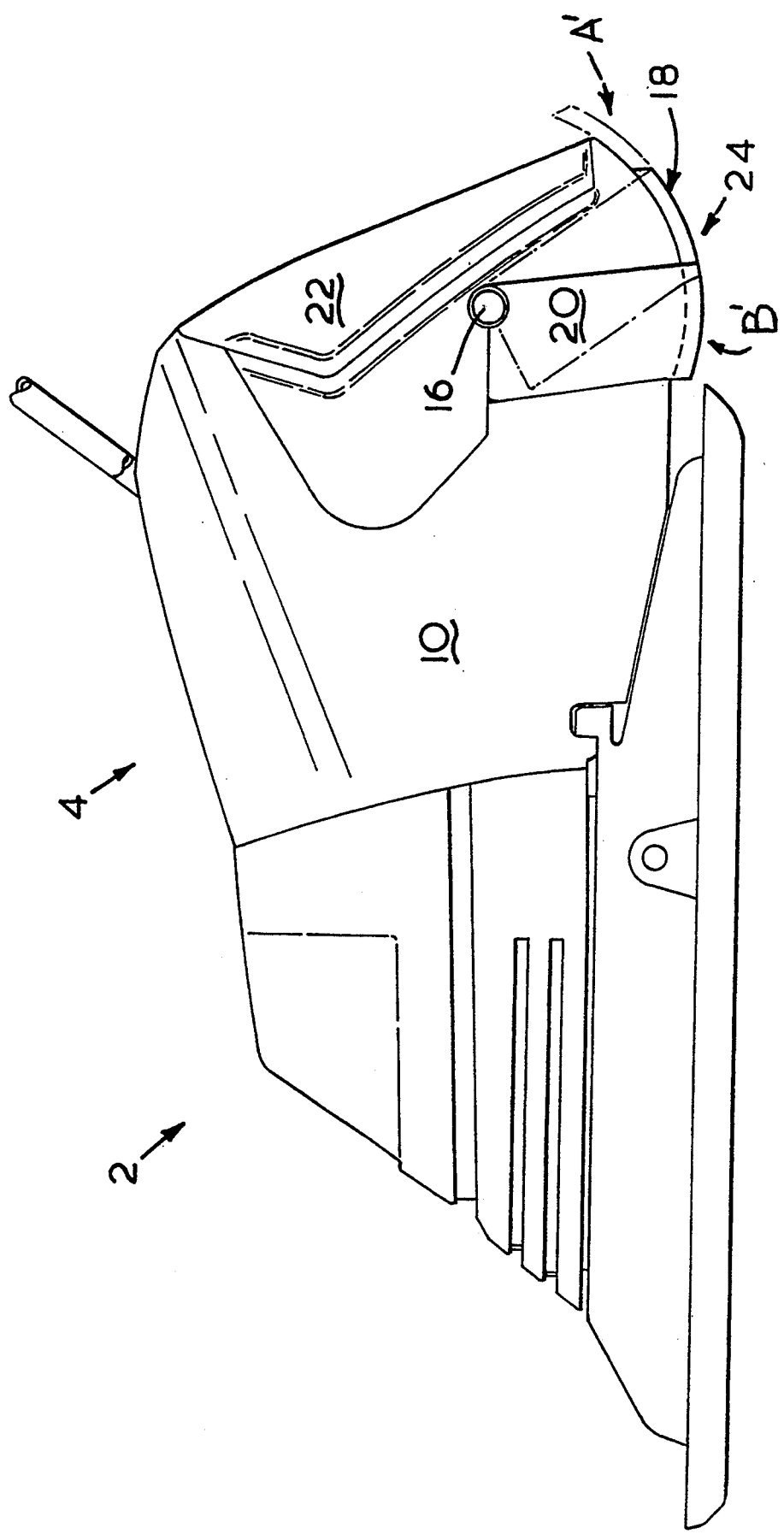
FIG. 3 is a general view of a second embodiment of a lawn mower of the present invention showing the grass collecting means.
Figure 4:
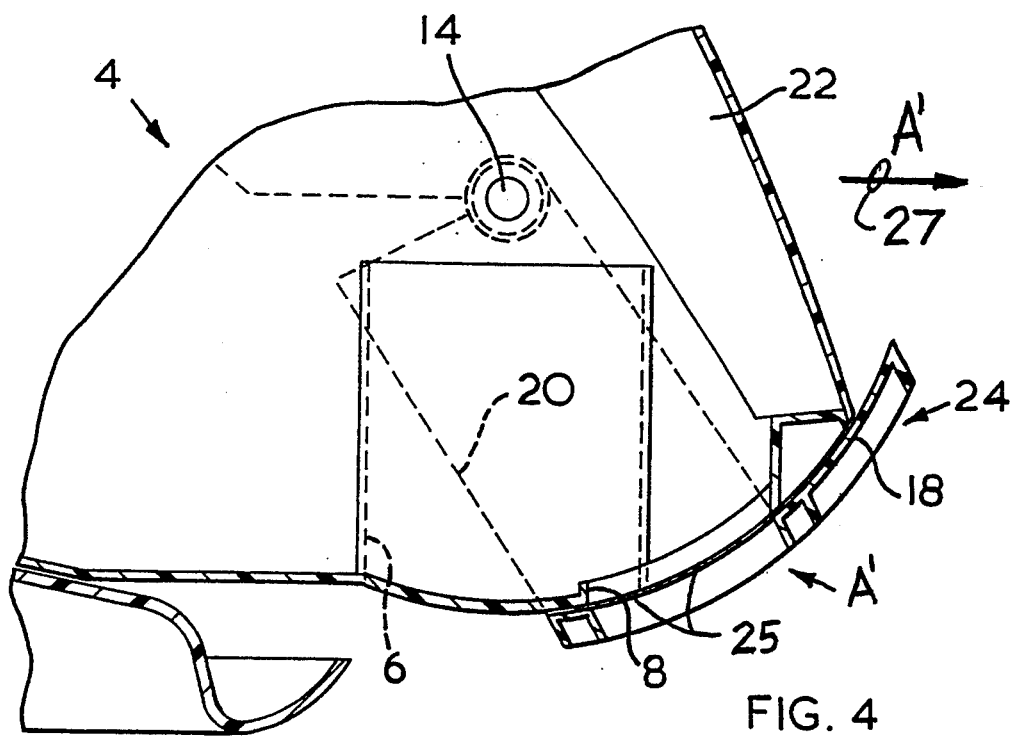
FIG. 4 is an enlarged detail view, partially in section, of a second embodiment of a lawn mower of the present invention showing the grass collecting means arranged to collect garden debris.
Figure 5:
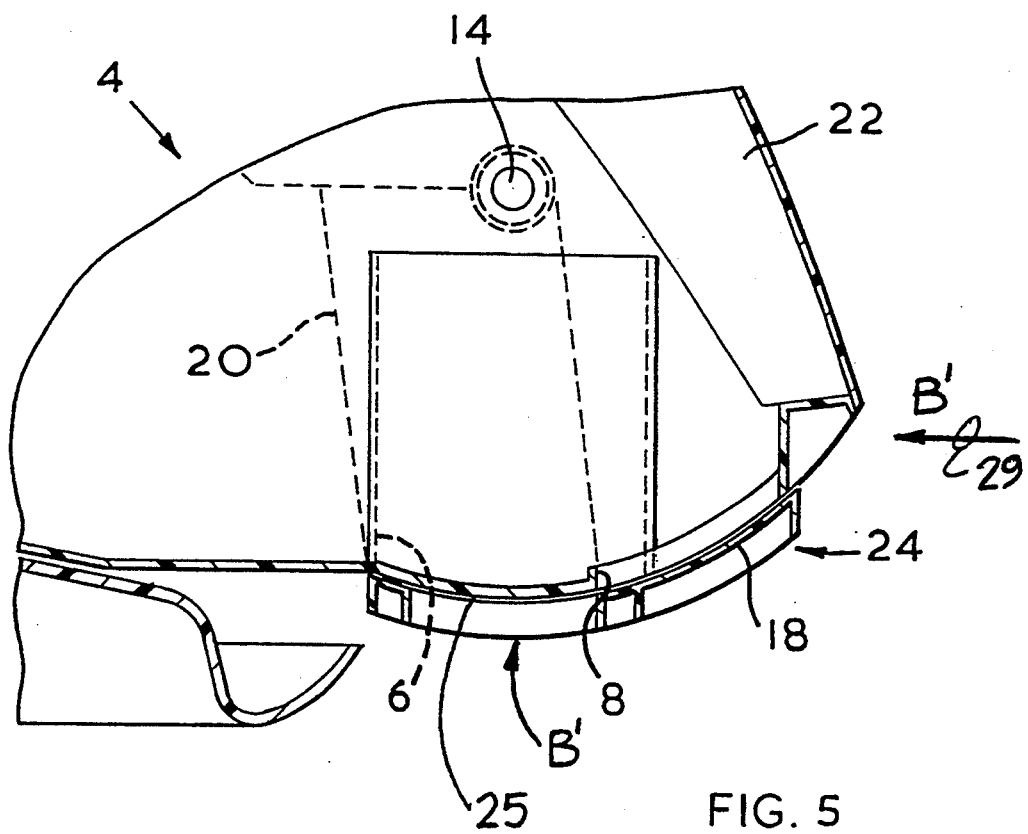
FIG. 5 is an enlarged detail view, partially in section, of the embodiment of FIG. 4, showing the grass collecting means arranged to collect grass.

In an alternative embodiment, as shown in FIGS. 3 through 5, the flap 24 is of modified design and deeper than the flap 12 of the first embodiment. It is provided with a slot 25 which extends across substantially the full width of the grass box 4 in the region of the flap adjacent to the mower 12. The depth of slot 25 is approximately equal to the depth of the debris collection aperture 8.

The operation of the mower is similar to that of the mower of the first embodiment, except that in the grass collection mode, the debris collection aperture 8 is closed by the solid portion of the flap 24, and in the debris collection mode both the grass collection aperture 6 and the debris collection aperture 8 are open. With reference to FIG. 3, A' now represents the position of flap 24 (in phantom) in the debris collection mode, and B' represents the position of the flap (in solid) in the grass collection mode. Referring now to FIGS. 4 and 5, 27 represents the direction of movement to pick up debris, and 29 represents the grass collection direction. In the debris pick-up mode as shown in FIG. 4, flap 24 has left grass collection aperture 6 unoccluded, and has aligned its slot 25 with debris collection aperture 8. When the operator desires solely to pick up grass clippings, however, he or she moves flap 18 to its position shown in FIG. 5. Now the flap slot 25 is aligned with grass collection aperture 6, but the flap 24 has occluded debris collection aperture 8.

The present invention has been disclosed in connection with specific embodiments. However, it will be apparent to those skilled in the art that variations from the illustrated embodiments may be undertaken without departing from the spirit and scope of the invention.

What is claimed is:

1. A lawn mower of the type which collects grass cuttings and garden debris, comprising:
   a motor-driven blade rotatable about a substantially vertical axis, at least one fan rotatable about said vertical axis to produce an airstream and further comprising means for grass collection in which grass collection is aided by suction from said airstream produced by said at least one fan, wherein said means for grass collection includes a member connected to said mower and adjustable between a first position on said mower in which said means for grass collection is adapted to collect grass cut by the mower and deposited on the ground, and a second position on said mower in which said means for grass collection is adapted to collect garden debris including leaves lying on the ground.

2. A lawn mower according to claim 1, wherein the means for grass collection includes a grass box having a first aperture for grass collection, a second aperture for debris collection, and a closure which is adapted to be adjusted between a first position in which the grass collection aperture is closed and the debris collection aperture is open, and a second position in which the grass collection aperture is open and the debris collection aperture is closed.

3. A lawn mower according to claim 2, wherein said mower in operation is supported above the ground on a cushion of air.

4. A lawn mower according to claim 1, wherein said means for grass collection includes a grass box having a first aperture for grass collection, a second aperture for debris collection, and a closure which is adapted to be adjusted between a first position in which both the grass collection aperture and the debris collection aperture are open, and a second position in which the grass collection aperture is open and the debris collection aperture is closed.

5. A lawn mower according to claim 4, wherein said closure defines a slot which is aligned with the debris collection aperture when said closure is in its first position.

6. A lawn mower according to claim 5, wherein said slot is aligned with the grass collection aperture when said closure is in its second position.

7. A lawn mower according to claim 6, wherein said grass box has a predetermined width, and wherein said closure slot extends across substantially the width of the grass box in the region of the closure adjacent the mower.

8. A lawn mower according to claim 4, wherein said mower in operation is supported above the ground on a cushion of air.

9. A method for using a lawn mower of the type which collects grass cuttings and garden debris to collect, selectively, grass cuttings deposited on the ground and garden debris including leaves lying on the ground, wherein said lawn mower includes a motor-driven blade rotatable about as substantially vertical axis, at least one fan rotatable about said vertical axis to produce an airstream and adjustable means having a member connected to said mower for grass collection in which grass collection is aided by suction from said airstream, comprising the steps of:
   selectively adjusting said member of said means for grass collection to one of a first position on said mower in which said means for grass collection collects said grass cut by said mower and deposited on the ground and not said garden debris, and a second position on said mower in which said means for grass collection collects at least said garden debris.

* * * * *